3,582,507
AQUEOUS DISPERSIONS OF POLYAMIDE RESINS
Dwight E. Peerman, Minneapolis, Minn., assignor to
General Mills, Inc.
No Drawing. Continuation-in-part of abandoned application Ser. No. 460,571, June 1, 1965. This application Sept. 16, 1968, Ser. No. 762,363
Int. Cl. C08g 20/26; C08j 3/16
U.S. Cl. 260—23                                                                     16 Claims

ABSTRACT OF THE DISCLOSURE

There is disclosed stabilized aqueous dispersions of polyamide resins, particularly of polymeric fat acid polyamides employing a carboxy vinyl polymer as a dispersion stabilizer. Aqueous dispersions of polyamides are useful as adhesives.

---

This application is a continuation-in-part application of my copending U.S. application, Ser. No. 460,571 filed June 1, 1965 now abandoned.

This invention relates to stabilized aqueous dispersions of polyamide resins and in particular, to aqueous dispersions of polymeric fat acid polyamides employing a carboxy vinyl polymer as a stabilizer. These aqueous dispersions of polyamides are useful as adhesives.

In the past, stable, aqueous dispersions of polyamide resins where the particle size of the resin was substantially greater than 1 micron, could not be achieved. With very small particle sizes on the order of 0.1 to 1 micron, in order to achieve a stable dispersion it was also necessary that an intrinsic emulsifier, either acid or base, be employed however. It has now been found that the use of a carboxy vinyl polymer as a dispersion stabilizer will provide stable polyamide dispersions when particle sizes up to about 300 microns are employed. It was further found that the use of such a protective colloid stabilizer permits the omission or elimination of an intrinsic emulsifier.

It has also been found that such dispersions provide for improved adhesion to substrate of the dry polyamide film applied as the aqueous dispersion. Also provided is improved appearance of the fused film when heat is applied. Unexpectedly the strength of the adhesive bond, using the dispersions of the present invention, is increased over the use of the polyamide applied merely as a dry powder or over the use of other materials as stabilizers in aqueous dispersions. Accordingly, the use of a specific stabilizer as set forth hereinabove in aqueous dispersions of polymeric fat acid polyamides provides desirable properties in four important properties of aqueous dispersions, namely (1) Stability of the dispersion
(2) Adhesion of the dry film to substrate
(3) Appearance of the fused film
(4) Strength of the adhesive bond.

The use of the adhesive polyamide resins in the aqueous dispersion form also has attendant advantages such as the elimination of dangerous and expensive solvents, relative freedom from odor and ease of control of the viscosity of the dispersion.

The aqueous dispersions of the present invention in addition to being useful as adhesives for bonding polyethylene, paper, cloth, metals such as aluminum and steel, are also useful as coating materials.

The polyamides dispersed in the present invention are the polymeric fat acid polyamides. Any polymeric fat acid polyamide which is pulverizable may be employed herein. Polymeric fat acid polyamides are well known and commercially available. Descriptions of these may be found in U.S. Pats. 2,379,413 and 2,450,940. Especially preferred for use in the present invention are the polyamides described in Belgian Pat. 631,245, U.S. Pat. 3,396,108, and commonly assigned copending U.S. patent application Ser. No. 296,048 filed July 18, 1963.

Accordingly, any solid or semi-solid pulverizable polymeric fat acid polyamide may be employed herein. These resins are generally prepared by reaction under conventional amidification conditions of a polymeric fat acid or mixtures thereof with other dicarboxylic acids with a diamine or mixtures thereof with alkanolamines. The reaction conditions are generally from 100 to 300° C. for from 1 to 8 hours and preferably from 2 to 4 hours at about 200° C. Essentially, molar equivalent amounts of the reactants are employed; however, an excess of up to 10 equivalent percent of either carboxyl or amine may be employed. In general, products in which the amine number or acid number exceeds 20 are to be avoided. The amine number may be defined as the milligrams of potassium hydroxide equivalent to the amine groups in a one-gram sample. The acid number is correspondingly the milligram of KOH equivalent to the carboxyl groups in a one-gram sample.

The preparations of the preferred polyamides are found in the Belgian patent and the U.S. applications mentioned above, the disclosure of which is hereby incorporated by reference. Also, one method of preparing polymeric fat acids can be found in U.S. Pat. 3,157,681.

As disclosed in said Belgian patent and the U.S. applications mentioned above, the term "polymeric fat acids" as used herein is intended to be generic to polymerized acids obtained from "fat acids." The term "fat acids" is intended to include saturated, ethylenically unsaturated and acetylenically unsaturated naturally occurring and synthetic monobasic aliphatic acids containing from 8 to 24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched or straight chain, poly- and mono-ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodimic acid, eicosatetraenoic acid, nisinic acid, scoliodonic acid, and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize.

Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, behenolic acid and isamic acid.

Because of their ready availability and relative ease of polymerization, oleic and linoleic acids are the preferred starting materials for the preparation of the polymeric fat acids. Mixtures of thes two acids are found in tall oil fatty acids and, accordingly, commercial tall oil fatty acids are the common source for preparing the polymeric fat acids.

Having obtained the polymeric fat acids or derivatives as described above, they may then be fractionated, for example, by conventional techniques of distillation or solvent extraction. They may be hydrogenated (before or after distillation) to reduce unsaturation under hydrogen pressure in the presence of a hydrogenation catalyst.

Typical compositions of polymeric fat acids, based on unsaturated $C_{18}$ tall oil fatty acids, which are the starting materials for the polyamides employed in the present invention, are:

$C_{18}$ monobasic acids ("monomer") 0–15% by weight;
$C_{36}$ dibasic acids ("dimer") 60–99.5% by weight;
$C_{54}$ (and higher) ("trimer") polybasic acids 0.2–35% by weight.

The dimer rich fractions (70% and above) are the most desirable, and the preferred starting acids are those containing a dimer acid content of greater than 80% by weight which are obtained generally by high vacuum distillation or solvent extraction techniques. The relative ratios of monomer, dimer and trimer (or higher) in unfractionated polymeric fat acids are dependent on the nature of the starting material and the conditions of polymerization. For the purposes of this invention, the term "monomeric fat acids" refers to the unpolymerized monomeric acids or derivatives present in the polymeric fat acids; the term "dimeric fat acids" refers to the dimeric acids or derivatives (formed by the dimerization of two fat acid molecules); and the term "trimeric fat acids" refers to the residual higher polymeric forms consisting primarily of trimeric acids or derivatives, but containing some higher polymeric forms.

For the purposes of this invention, unless otherwise specified, the "monomeric," "dimeric," and "trimeric" fat acids, were determined by a micromolecular distillation analytical method. The method is that of Paschke, R. F., et al., J. Am. Oil Chem. Soc. XXXI (No. 1), 5 (1954), wherein the distillation is carried out under high vacuum (below 5 microns) and the monomeric fraction is calculated from the weight of product distilling at 155° C., the dimeric fraction is calculated from that distilling between 155° C. and 250° C., and the trimeric (or higher) fraction is calculated based on the residue. Another method of determining these fractions is by gas liquid chromatography of the corresponding methyl esters. In such method an "intermediate" fraction between monomer and dimer is observed. In this method of analysis the dimeric fat acid content reported is slightly lower than that found by the micromolecular distillation method.

The diamines employed in the preparation of the polyamides have the general formula

where R' is an aliphatic, cycloaliphatic, araliphatic or aromatic hydrocarbon radical having from 2 to 40 carbon atoms and may be straight or branched chain. Preferably R' is an alkylene radical having from 2 to 12 carbon atoms. Illustrative of the diamines which may be employed are 1,2-diaminoethane, 1,3-diaminopropane, 1,4-diaminobutane, 1,6-diaminohexane, 1,10-diaminodecane, 1,12-diaminododecane, 1,18-diaminooctadecane, bis(aminomethyl) benzene, bis(aminoethyl) benzene, cyclohexyl bis(methylamine), xylylene diamine, methylene dianiline, and the diamine of a dimeric fat acid, hereinafter referred to as dimer diamine. In the dimer diamine prepared from a polymerized $C_{18}$ acid such as oleic or linoleic acid, or mixtures thereof found in tall oil fatty acids, R' will contain 36 carbon atoms. In addition, R' may be branched as in 3,4-diethyl-1,6-diamino-hexane, 3-thyl-1,8-diaminooctane, 2-nonyl-1,10-diaminodecane and 2-octyl-1,11-diaminoundecane.

A portion of the diamine may be replaced by an alkanolamine such as those having the general formula $$H_2N{-}R'''{-}OH$$

where R''' is a divalent aliphatic hydrocarbon radical having from 2 to 8 carbon atoms and preferably an alkylene radical having from 2 to 8 carbon atoms. Illustrative thereof are ethanolamine, propanolamine, butanolamine, 2-amino-3-hexanol, 2-amino-4-pentanol 5-amino-4-octanol and 3-amino-3-methyl-2-butanol. R''' may be straight or branched chain.

The other dicarboxylic acids which may be employed along with the polymeric fat acid are those having the formula

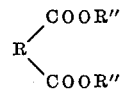

where R is an aliphatic, cycloaliphatic, araliphatic or aromatic hydrocarbon radical having from 2 to 20 carbon atoms and R'' is hydrogen or a lower aliphatic hydrocarbon radical having from 1 to 8 carbon atoms such as the alkyl groups, methyl, ethyl, propyl, butyl, hexyl and octyl. The preferred range of these acids is where R is from 2 to 8 carbon atoms such as adipic, succinic, glutaric, pimelic, suberic, azelaic, sebacic, terephthalic, isophthalic, cyclohexane dicarboxylic acid, cyclohexane diacetic acid and the like with the acids wherein R is a divalent alkylene radical being the more preferred.

Where the homopolymer polyamides are desired, essentially equivalent amounts of amine and carboxyl are employed. Where the other dicarboxylic acid is employed, the carboxyl equivalent ratio of polymeric fat acids to other dicarboxylic acid (adipic, sebacic, or mixtures thereof) is preferably varied from about 1:0.05 to 1:0.5. The amount of diamine and/or alkanolamine must be varied based on the relative amount of carboxylic acid present. The equivalents of carboxylic acid are essentially equal to the amine and hydroxyl equivalents (where alkanolamine is present). The molar equivalent ratio of alkylene diamine to alkanolamine is preferably varied from about 20:1 to 1:2, and preferably in the range of about 10:1 to 1:1.

In forming the aqueous dispersion, the solid or semi-solid pulverizable polymeric fat acid polyamide is ground or otherwise pulverized and dispersed with agitation into water containing the protective colloid stabilizer. In forming relatively high particle size dispersion the polyamide resin is preferably pulverized to a point where substantially all the particles are of a size in excess of 10 microns. The size of the particles may range up to about 300 microns. A typical screen analysis of pulverized polyamide resin is as follows:

| Screen size | 50 | 100 | 140 | 200 | 270 | 325 | <325 |
|---|---|---|---|---|---|---|---|
| Size of opening (microns) | 297 | 149 | 105 | 74 | 53 | 44 | ----- |
| Percent resin retained | 0.6 | 21.1 | 29.7 | 31.0 | 3.6 | 4.2 | 9.8 |

As is apparent, the particle size of the major portion is in the range of about 70–150 microns.

In forming dispersions of lower particle size, i.e. below 10 microns the dispersion is preferably achieved by high shear agitation at a temperature above the melting point of the resin in the water containing the stabilizer. A pressure vessel should generally be used in this method of dispersion since it may involve heating an aqueous solution to above the boiling point and escape of the water must be prevented.

In forming the large particle size dispersions the amine number may exceed the acid number. In the very small particle size dispersions (0.1–1 micron) it is preferable that the amine number not exceed the acid number, particularly at the lower end of the range.

The protective colloid stabilizers suitable for use in preparing the stable aqueous dispersions of the polyamides described above are carboxy vinyl polymers. Carboxy vinyl polymers are polymers which contain a vinyl group and a carboxyl group. Illustrative of such polymers are the homo and copolymers of acrylic acid. Acrylic acid has the formula $CH_2=CH-CO_2H$ and thus possesses a vinyl group and carboxyl group. This acid is sometimes called ethylene (vinyl) carboxylic acid. In addition to the polyacrylic acid polymers themselves, the corresponding acrylate polymers such as ammonium polyacrylate may be employed.

As indicated copolymers of acrylic acid may be employed. Where employed it is preferable that the polyacrylic acid or acrylate comprise at least 90% and, more preferably, at least 95% by weight of the polymer. Illustrative of the co-monomer employed with acrylic acid, to form copolymers are allyl compounds such as allyl starch or sucrose. In general, any copolymer of polyacrylic acid having substantially the same infra red absorption spectra as the polyacrylic acid homopolymer is suitable for use in the present invention.

The carboxyl vinyl polymers are commercially available in varying molecular weights. Illustrative of such polymers are those supplied by B. F. Goodrich such as WS–801, a polyacrylic acid polymer having a molecular weight product, above 200,000 and having the same infra-941, polyacrylic acid polymers having varying molecular weights, Carbopol 934 being an extremely high molecular weight product, above 200,000 and having the same infra red scan as WS–801 (polyacrylic acid) and an equivalent weight of near 75; and Carbopol 960 and 961 which are the corresponding ammonium salts of Carbopol 934 and 941 respectively; and WS–851, an ammonium polyacrylate polymer.

The properties of some of the foregoing commercially available products are as follows:

|  | WS–801 | WS–851 | Carbopol 934 |
|---|---|---|---|
| Molecular weight | Approx. 250,000 | Approx. 250,000 | Greater than 250,000. |
| Color and form | White powder | White powder | White powder. |
| pH (5% solution) | 2.1 | 6.0 | 3.1[1] |
| Color (5% solution) | Trace yellow | Water white | Water white.[1] |
| Clarity (5% solution) | Clear | Slightly hazy | Very slight haze.[1] |
| Viscosity in $H_2O$ (cps).: | | | |
| 5% solution | 50 | 450 | 300.[1] |
| 10% solution | 600 | 1,200 | 4,000.[2] |

[1] 1% solution. [2] 2% solution.

A colloid of the stabilizer is prepared by dispersing the stabilizer in water with agitation. Solutions of the carboxy vinyl polymer stabilizer of from 0.1 to 15% solids content may be employed but preferably from 0.5 to 12% solution by weight. In general, from 0.5 to 2%, and preferably, a 1% solution by weight of the high molecular weight polymers (Carbopol 934) in water is employed with the typical particle size range set forth herein. With the lower molecular weight polymers (WS–801 and 851) solutions of from 3 to 15% solids content are generally employed, and preferably from 4–12% solutions by weight.

The polyamide is dispersed into the solution of stabilizer in amounts to provide up to a 35% by weight concentration. With concentrations much greater than 35%, such as in excess of 40%, the aqueous dispersion has a high viscosity which is generally impractical for application. Concentrations as low at 1% may be employed. However, for most of the practical applications, the concentrations employed lie in the range of 10 to 40% and most commonly, the 25 to 35% concentrations are employed.

It was found that the viscosity can be controlled by control of the pH. For most applications, the viscosities with the high molecular weight carboxy vinyl polymer (Carbopol 934) at a pH of 3 to 4 and 9 to 10, and preferably 3.5 and 9.5, are the most suitable. At intermediate pH values (4–9) high viscosities are encountered which may raise problems in handling. With the lower molecular weight polyacrylic acid polymer (WS–801), a pH of 6–7 also provides useful viscosities. With the lower molecular weight ammonium polyacrylate polymer (WS–851), useful viscosities are also provided at a pH of less than 3. The pH is obtained by adding base to the stabilizer solution. This is commonly accomplished by adding an alkali metal hydroxide to the stabilizer solution. Sodium carbonate may also be employed.

The invention can best be illustrated by means of the following examples:

PREPARATION OF THE STABILIZER
COLLOID SOLUTIONS

Example I (A)

Ingredients: Grams
  Carbopol 934 _____ 5
  Tap water at 85° C. _____ 495

Procedure:
  Into a Waring Blendor bowl was placed the tap water. The Carbopol 934 was slowly added with stirring. After 5 minutes of blending, the pH was 3.1. The resulting solution was neutralized with suitable base (NaOH) to a pH of 3.4.

(B)

In the same manner, 0.5% solution of stabilizer was also provided.

Example II

Ingredients: Grams
  Carbopol 934 _____ 5
  Sodium carbonate (10% solution) _____ 80
  Tap water at 85° C. _____ 415

Procedure:
  Into a Waring Blendor bowl was placed the tap water and sodium carbonate solution. The Carbopol 934 was added with moderate agitation which was maintained for 5 minutes. The pH of the solution was 9.5.

Example III (A) Preparation of 8.0% stabilizer using WS–851

Ingredients: Grams
  Good-Rite WS–851 _____ 10
  Tap water at 85° C. _____ 460

Procedure:
  Same as for Example IA above. The pH of this solution was 5–6 but was not neutralized.)

(B) Preparation of 4.0% stabilizer using WS–851

Same as IIIA above except 20 g. of Good-Rite WS–851 and 480 g. of tap water were used. A pH of about 6 was obtained.

Example IV

(A) Preparation of 12.0% stabilizer using WS-801

Ingredients: Grams
  Good-Rite WS-801 _____ 60
  Tap water at 85° C. _____ 440

Procedure:
  Same as for Example IA. (The pH of this solution was 5-6 but was not neutralized.)

(B) Preparation of 6% stabilizer using WS-801

Procedure:
  Same as IVA above except 30 g. of WS-801 and 470 g. of tap water were used. A solution pH of 2-3 was obtained.

PREPARATION OF POLYAMIDE AQUEOUS DISPERSIONS

Aqueous dispersions of polymeric fat acid polyamides were prepared as follows:

Into an appropriate beaker was added the desired colloidal suspension. To this solution was added with stirring the desired pulverized polyamide resin. Agitation was continued for 2 to 3 minutes to provide the desired aqueous dispersion. Sufficient polyamide resin is employed to provide the desired concentration.

Several polyamides were dispersed. These polyamides were as follows:

(R) Polyamide of essentially equivalent amounts of ethylene diamine and polymerized tall oil fatty acids, having a dimer content of about 92% to provide a polyamide having the following analysis:

Acid No. _____ 9.8
Amine No. _____ 0.5
Ball & Ring softening point ° C. _____ 108
Viscosity at 190° C., poises _____ 31.7

(S) Polyamide of essentially equivalent amounts of ethylene diamine and a mixture of polymerized tall oil fatty acids having a dimer content of 95% and adipic acid to provide a polyamide having the following analysis:

Acid No. _____ 4.9
Amine No. _____ 1.1
Ball & Ring softening point, ° C. _____ 175
Viscosity at 210° C., poises _____ 39.4

(T) Polyamide of ethylene diamine, ethanolamine, adipic acid and polymerized tall oil fatty acids having a dimer content of 92%, having the following analysis:

Acid No. _____ 9.7
Amine No. _____ 0.9
Ball & Ring softening point ° C. _____ 171

(X) Polyamide of essentially equivalent amounts of ethylene diamine and polymerized tall oil fatty acids having a dimer content of 92.5 to provide a polyamide having the following analysis:

Acid No. _____ 11.7
Amine No. _____ 0.7
Ball & Ring softening point ° C. _____ 102
Viscosity, cps. at—
  225° C. _____ 300
  205° C. _____ 420

(Y) Polyamide of essentially equivalent amounts of ethylene diamine and polymerized tall oil fatty acids having a dimer content of 92.5 to provide a polyamide having the following analysis:

Acid No. _____ 1.9
Amine No. _____ 15.7
Ball & Ring softening point ° C. _____ 103
Viscosity, cps. at—
  225° C. _____ 390
  205° C. _____ 660

(Z) Polyamide resin of ethylene diamine and polymerized tall oil fatty acids having a dimer content of 70% to provide a polyamide having the following analysis:

Acid No. _____ 3.0
Amine No. _____ 6.6
Ball & Ring softening point ° C. _____ 109
Viscosity at 160° C., poises _____ 22.5

In each instance, a dispersion of polyamide of a 35% concentration was prepared. The results achieved with these dispersions are seen in Table I.

In a similar manner, aqueous dispersions of a polyamide resin similar to Resin R but having an amine number of 1.3 and acid number of 3.4 of a 35% concentration, were prepared employing as the stabilizer WS-801 and WS-851. The results achieved with these dispersions can be seen from the following Table II:

TABLE I

| Example | Colloid of Example | Viscosity of colloid (cps.) | Polyamide | Viscosity of dispersion (cps.) | Stability | Adhesion of dried film on steel | Appearance of film | Tensile shear steel (p.s.i.) |
|---|---|---|---|---|---|---|---|---|
| V    | I(A) | 680 | R | 5,800 | Good | Good | Excellent | 1,087 |
| VI   | I(A) | 680 | S | 8,400 | do   | do   | do        | 1,431 |
| VII  | I(B) | 100 | R | 970   | do   | Poor | Good      | 1,268 |
| VIII | II   | 660 | R | 5,000 | do   | Good | Excellent | 877   |
| IX   | II   | 660 | T | 5,620 | do   | do   | do        | 260   |
| X    | II   | 660 | S | 4,650 | do   | do   | do        | 1,114 |
| XI   | II   | 680 | X | 9,800 |      |      |           | 940   |
| XII  | II   | 680 | Y | 9,400 |      |      |           | 1,025 |
| XIII | II   | 680 | Z | 8,100 |      |      |           | 1,095 |

TABLE II

| Colloid | Concentration (percent) | pH | Viscosity (cps.) Colloid | Viscosity (cps.) Dispersion | Dry film adhesion on steel | Tensile strength steel (p.s.i.) |
|---|---|---|---|---|---|---|
| Polyacrylic acid (WS-801) | 12.0 | 2-3 | 1,760 | 31,000 | Very good | 1,658 |
| Do                        | 6.0  | 2-3 | 72.5  | 8,700  | do        | 1,212 |
| Ammonium polyacrylate (WS-851) | 8.0 | 5-6 | 1,350 | 33,000 | do | 836 |
| Do                        | 4.0  | 6   | 348   | 13,000 | Good      | 741 |

The peel strength of a bond of aluminum to aluminum with the use of the dispersion of Example IX was compared with the use of the powdered resin alone using an adhesive thickness of 5 mils in each case. The peel strengths in lbs./in. width were determined in accordance with ASTM D-1876-61T.

| Powdered Resin T alone, lbs./in. width: | Aqueous dispersion Example VII, lbs./in. width |
|---|---|
| 11 | 19 |
| 10 | 15 |
| 11 | 14 |
| 10 | 14 |
| 11 | 13 |
| 11 | 13 |

The tensile shear strength in lbs./in.$^2$ of aluminum to aluminum bonded with the powdered resins alone and with the powdered resins employed in the form of the aqueous dispersion were determined in accordance with ASTM D–1002–53T and a 5 mil adhesive thickness was employed.

| Powdered Resin R alone | Aqueous dispersion, Example V | Powdered Resin T alone | Aqueous dispersion, Example IX | Powdered Resin S alone | Aqueous dispersion, Example VI |
|---|---|---|---|---|---|
| 940 | 1,380 | 620 | 920 | 950 | 1,350 |
| 890 | 1,080 | 740 | 720 | 970 | 1,300 |
| 820 | 1,140 | 520 | 1,080 | 1,030 | 1,470 |
| 750 | 1,070 | 500 | 1,020 | 1,070 | 1,210 |
| 880 | 1,160 | 740 | 920 | 980 | 1,390 |
| ¹855 | ¹1,165 | ¹625 | ¹930 | ¹1,000 | ¹1,345 |

¹ Average.

EXAMPLE XIV

A polyamide was prepared from hydrogenated distilled polymeric fat acid and diaminodicyclohexyl methane using equivalent amounts of amine and acid. The polymer produced had the following properties:

| | |
|---|---|
| Inherent viscosity | 0.53884 |
| Milliequivalents acid | 17.6 |
| Milliequivalents amine | 44.7 |
| Ball and ring melting point, °C. | 162.7 |
| Tensile strength, p.s.i. | 4,754 |
| Elongation, percent | 267 |
| Flexural modulus, p.s.i. | 131,450 |

The polymeric fat acid from which the polymer was prepared had the following analysis:

| | |
|---|---|
| Acid value | 191.0 |
| Saponification value | 196.3 |
| Iodine value | 8.9 |
| Monomer, percent * | 1.3 |
| Dimer, percent * | 93.3 |
| Trimer, percent * | 0.6 |
| Intermediate, percent * | 4.8 |

* By gas liquid chromatography.

The 4,4-diaminodicyclohexyl methane (hydrogenated methylene dianiline) had an amine equivalent weight of 105.45.

The polyamide described above was pulverized in a hammermill with cooling to a powder of the following screen analysis:

| | Microns | Percent retained |
|---|---|---|
| U.S. Standard Screen: | | |
| 50 | 297 | 75.9 |
| 100 | 149 | 21.1 |
| 140 | 105 | 2.2 |
| 200 | 74 | 0.6 |
| 270 | 53 | 0.2 |
| 325 | 44 | 0.0 |

The portion passing the 50 mesh screen (297 microns) was set aside for suspension in water. This powder has particles ranging from 53 to 149 microns in diameter.

This powder was dispersed in a previously described 1% Carbopol 934 colloidal solution by vigorous stirring. The dispersion was a water white, stable dispersion with a viscosity of 11,800 cps. at 25° C. It contained 35% solids by weight.

This dispersion was spread on steel panels and dried with heat and sealed at 200° C. in the platens of a heated press at 625 p.s.i. Tensile shear measurements were made following procedure as in ASTM D1002–64. The steel panels bonded with the polyamide had a tensile shear strength of 879 p.s.i. and thus provide a strong fastening method for steel.

EXAMPLE XV

A polyamide was prepared from ethylene diamine and polymerized tall oil fatty acids in which the amine was present to the extent of 0.97 equivalents to 1.00 equivalents of carboxyl. The polymerized acids used had monomer, dimer and trimer such that the dimer content was 65% and the trimer/monomer ratio was 1.4. The polyamide which resulted had an acid number of 9.6, amine number of 0.5, a ball and ring softening point of 110° C., and a melt viscosity at 190° C. of 36 poises.

The polyamide above (350 grams) was loaded into a stainless steel autoclave equipped with a high shear stirrer. Also charged into the autoclave was 643.5 grams of tap water and 6.5 grams of Carbopol 934. Carbopol 934 is polyacrylic acid of a molecular weight greater than 250,000 and an equivalent weight as an acid of 75.

The autoclave was closed to the atmosphere and heat was applied to bring the temperature inside the autoclave to 130° C. Agitation as the pot was heated was moderate. Upon achieving 130° C. the agitator was turned up so that very high shear was created and maintained at this level of agitation for 15 minutes. The agitator was then slowed down and the autoclave cooled to slightly above room temperature with slow agitation. Pressure inside the autoclave at the point where the temperature reached 130° C. was 23 pounds per square inch.

Upon cooling the product was discharged from the autoclave and allowed to stand overnight. The next day there was no evidence of separation in the smooth uniform dispersion. Its viscosity was measured with a Brookfield viscometer using Spindle No. 2 at 20 r.p.m.'s and found to be 414 centipoises at 25° C.

EXAMPLE XVI

A polyamide was prepared from hydrogenated, distilled polymerized tall oil fatty acids having an analysis as follows:

| | |
|---|---|
| M, percent * | 1.9 |
| I, percent * | 2.2 |
| D, percent * | 94.6 |
| T, percent * | 1.3 |
| Saponification value | 197.3 |
| Iodine value | 8.3 |

* By gas-liquid chromatography (GLC).

This acid was reacted with hexamethylenediamine to form a polyamide with the following characteristics:

| | |
|---|---|
| Acid No. | 1.0. |
| Amine No. | 0.3. |
| Melt viscosity in the Brabender | 470 at 50 r.p.m. at 150° C. |
| Ball and ring softening point | 120° C. |
| Inherent viscosity | 0.537 (5.5% solution). |
| Tensile yield value | 1537 p.s.i. |
| Tensile ultimate | 4095 p.s.i. |
| Elongation (percent) | 533. |

Two hundred fifty grams of the polyamide above were placed together with 742.5 grams of tap water and 7.5 grams of Carbopol 934 in a stainless steel autoclave equipped with a high speed high shear agitator. Moderate agitation was used as the pot temperature of the autoclave was heated to 180° C. at which point a pressure of 122 lbs. per sq. in. was observed. Heating was discontinued which allowed the pot temperature to decrease to 150° C. at which point high shear agitation was begun and maintained for 15 minutes. The autoclave was then cooled to a temperature slightly above room temperature with mild agitation. The white suspension of resin which was discharged, exhibited a few large particles but overnight storage showed it to be stable and filtration through a 50 mesh screen removed the few large particles. The viscosity of this suspensoid measured at 25° C. was found to be 600 centipoises.

A 10 mil wet film of the suspensoid was spread on a steel panel. The panel was placed in a forced draft air oven to drive off the water in the film. The adhesion of the dried film was checked by rubbing the surface with the finger. The adhesion was judged to be excellent because the dried film could not be rubbed from the steel panel.

The suspension of this polyamide was spread on other steel panels and forced dried. Tensile shear specimens were made from these steel panels which were 0.64 inch in thickness by placing the panels with the dried suspensoid film between them on a hot plate which fused the suspensoid film and adhered the two panels together. Five one-inch strips were tested to determine the load which would cause failure and the tensile shear strength per square inch was calculated. When tested on an Instron tester in which the crosshead speed was 0.2 inch per minute the tensile shear strength of these specimens gave an average value of 2,098 pounds per square inch. This demonstrates that the suspensoid film, when dried and fused to form a bond gives an adhesive which is structurally stable at high loadings.

The peel value was determined in like manner using thin (0.007″) steel stock. The specimen preparation was similar to that used for the preparation of the tensile shear specimens. In this case, however, one-inch strips were loaded in peel. An average of 4 specimens thus tested were found to have a peel value of 18.5 lbs. This demonstrates that a dried suspensoid film when fused between two pieces of thin steel exhibits good resistance to peel separation.

Example XVII

A polyesteramide was prepared from distilled polymerized tall oil fatty acids having the following analysis:

| | |
|---|---|
| M, percent * | 2.3 |
| I, percent * | 2.4 |
| D, percent * | 92.5 |
| T, percent * | 2.8 |
| Sap. value | 198.3 |

* By GLC.

The charge for this polyamide was 100 parts by weight of the above described distilled dimer, 8 parts by weight of adipic acid, 8.2 parts by weight of ethylenediamine and 5.2 parts by weight of ethanolamine. The ratio of equivalents of total amine to those of acid was 0.97 to 1.00.

The polyamide which resulted had an acid number of 9.8, amine number of 1.3, a hydroxyl number of 8.1, and a melt viscosity of 26.3 poises. Its tensile strength was 354 lbs. per sq. in. and its elongation was 377%.

Four hundred thirty grams of the polyesteramide above were charged, together with 495 grams of tap water and 5 grams of Carbopol 934, to a stainless steel autoclave. Using the previously described procedures the temperature was raised to 180° C. at which time 106 lbs. per sq. in. of pressure were observed. After discharging, the smooth, creamy product was found to be stable. It had a viscosity at 25° C. of 1300 centipoises.

Using previously described procedures the tensile shear strength of this suspensoid which had been applied as a film, dried, and then fused between plates of steel was 767 lbs. per sq. in. Its peel strength was 14.5 lbs. per inch. The polyesteramide thus described can be fused to form a hot melt adhesive with good properties.

Example XVIII

A polyamide was prepared from distilled polymerized tall oil fatty acids containing 92.5% dimer and a trimer/monomer ratio of 1.22. This acid had an equivalent weight of 283. Dimer diamine was also used in the preparation of this polyamide. It was prepared from polymerized tall oil fatty acids containing 97.1% dimer, 0.3% monomer and 2.6% trimer. This dimer diamine had an amine number of 204.7 and equivalent weight of 274. The polyamide was prepared using 991 parts by weight of the distilled acids, 205 parts by weight of the dimer diamine and 82.5 parts by weight of ethylenediamine. It had a melt viscosity at 225° C. of 45 poises, a melting point of 106° C., an acid number of 3.9, and an amine number of 2.1.

Five hundred grams of the polyamide above were charged, together with 500 grams of tap water and 5 grams of Carbopol 934, into a stainless steel autoclave. The procedure was the same as that described in previous examples. The temperature of 130° C. was reached at which time a pressure of 31 lbs. per sq. in. was observed. The smooth suspensoid which resulted had a viscosity at 25° C. of 58.5 poises.

The suspensoid was applied to steel and tested as described in previous examples. It exhibited a tensile shear strength of 1353 lbs. per sq. in. which was the average of 5 specimens. It also had a peel strength of 50 lbs. per in. which was the average of 4 specimens. The aqueous dispersion of this polyamide is an excellent adhesive with good stability characteristics.

The dispersions are particularly useful as adhesives. They may also be used in coatings of paper, wood, metal and other articles. In producing films or sheets, the dispersions may be cast onto a suitable surface, the water removed by evaporation and the film subjected to heat to bring about agglomeration of the particles into a continuous film.

The dispersions may contain a number of different types of ingredients in addition to the polyamide. For example, the dispersion may contain pigments, inert fillers, dyes, anti-static agents, and anti-oxidants. A given dispersion may be formed from mixtures of two different polyamides and may be codispersed with other natural and synthetic resins.

The embodiments of this invention in which an exclusive property or privilege is claimed are defined as follows:

1. An aqueous dispersion consisting essentially of a polymeric fat acid polyamide in the form of particles having a size in excess of 0.1 micron, water and a carboxy vinyl polymer as a dispersion stabilizer, said aqueous dispersion containing from 0.1 to 15% of said carboxy vinyl polymer based on the weight of said polymer and water, said carboxy vinyl polymer having an infrared spectra absorption substantially identical to polyacrylic acid.

2. An aqueous dispersion as defined in claim 1 in which said polyamide has an acid number and amine number not greater than 20.

3. An aqueous dispersion as defined in claim 1 wherein said particles have a size in excess of 10 microns.

4. An aqueous dispersion as defined in claim 1 wherein said carboxy vinyl polymer is selected from the group consisting of ammonium polyacrylate, polyacrylic acid, and copolymers thereof comprising at least 90% by weight of said ammonium polyacrylate and said polyacrylic acid.

5. An aqueous dispersion as defined in claim 1 wherein said carboxy vinyl polymer is polyacrylic acid.

6. An aqueous dispersion as defined in claim 1 wherein said carboxy vinyl polymer is ammonium polyacrylate.

7. An aqueous dispersion as defined in claim 1 wherein said polyamide has a particle size of from 0.1 to 1 micron and an amine number and acid number not greater than 20, and said amine number does not exceed said acid number.

8. An aqueous dispersion as defined in claim 1 in which said polyamide is the ethylene diamine polyamide of polymerized tall oil fatty acids.

9. An aqueous dispersion as defined in claim 1 in which said polyamide is the amidification product of (A) ethylene diamine and (B) a mixture of adipic acid and polymerized tall oil fatty acids in which the equivalents of amine groups are essentially equal to the equivalents of carboxyl groups.

10. An aqueous dispersion as defined in claim 1 in which said polyamide is the amidification product of (A) a mixture of ethylene diamine and ethanolamine with (B) a mixture of polymerized tall oil fatty acids and adipic acid in which the equivalents of amine and hydroxy groups are essentially equal to the equivalents of carboxyl groups and the equivalents ratio of carboxyl groups from the polymerized tall oil fatty acids to adipic acid is in the range of 1:0.05 to 1:0.5 and the equivalents ratio of amine groups from ethylene diamine to ethanolamine is in the range of 20:1 to 1:2.

11. An aqueous dispersion as defined in claim 1 in which said polyamide is the amidification product of (A) a mixture of ethylene diamine and ethanolamine with (B) a mixture of polymerized tall oil fatty acids and sebacic acid in which the equivalents of amine and hydroxyl groups are essentially equal to the equivalents of carboxyl groups and the equivalents ratio of carboxyl groups from the polymerized tall oil fatty acids to sebacic acid is in the range of 1:0.05 to 1:0.5 and the equivalents ratio of amine groups from ethylene diamine to ethanolamine is in the range of 20:1 to 1.2.

12. An aqueous dispersion as defined in claim 1 in which said polyamide is the hexamethylene diamine polyamide of polymerized tall oil fatty acids.

13. An aqueous dispersion as defined in claim 1 in which said polyamide is the amidification product of polymerized tall oil fatty acids and a mixture of ethylene diamine and the diamine of polymerized tall oil fatty acids.

14. An aqueous dispersion as defined in claim 1 which contains from 1 to 40% by weight of said polyamide.

15. An aqueous dispersion as defined in claim 1 which contains from 10 to 35% by weight of said polyamide.

16. An aqueous dispersion consisting essentially of from 1 to 40% based on the total weight of the dispersion of a polymeric fat acid polyamide in the form of particles having a size from 0.1 to 300 microns, water and from 0.1 to 15% of a carboxy vinyl polymer dispersion stabilizer based on the weight of water and stabilizer, said carboxy vinyl polymer having an infrared spectra adsorption substantially identical to polyacrylic acid.

References Cited
UNITED STATES PATENTS

| | | | |
|---|---|---|---|
| 2,671,065 | 3/1954 | Ulrich | 260—29.6 |
| 2,767,089 | 10/1956 | Renfrew et al. | 260—23 |
| 2,824,848 | 2/1958 | Wittcoff | 260—29.2 |
| 2,909,462 | 10/1959 | Warfield et al. | 424—81 |
| 2,998,400 | 8/1961 | French | 260—29.6 |
| 3,447,999 | 6/1969 | Rogier et al. | 161—197 |

DONALD E. CZAJA, Primary Examiner

R. A. WHITE, Assistant Examiner

U.S. Cl. X.R.

161—214; 260—18, 29.2, 29.6

PO-1050
(5/69)

UNITED STATES PATENT OFFICE
CERTIFICATE OF CORRECTION

Patent No. 3,582,507                   Dated June 1, 1971

Inventor(s) Dwight E. Peerman

It is certified that error appears in the above-identified patent and that said Letters Patent are hereby corrected as shown below:

Col. 3, line 11, delete "thes" and insert therefor ---these---.
Col. 4, line 10, delete "3-thyl-" and insert therefor ---3-ethyl--
Col. 5, line 37, delete "product, above 200,000 and having the same infra-" and insert therefor ---of about 250,000; Carbopol resin 934, 940 and---.
Col. 5, line 74, delete "at" and insert therefor ---as---.
Col. 7, line 7, delete the "(".
       line 8, delete "5-6 but" and insert therefor ---2-3 (it---

Signed and sealed this 14th day of March 1972.

(SEAL)
Attest:

EDWARD M. FLETCHER, JR.          ROBERT GOTTSCHALK
Attesting Officer                Commissioner of Patents